US012228959B2

(12) United States Patent
Bouchard

(10) Patent No.: US 12,228,959 B2
(45) Date of Patent: Feb. 18, 2025

(54) CABLE INLINE PULL STATION RELEASE MECHANISM

(71) Applicant: KIDDE-FENWAL, LLC, Ashland, MA (US)

(72) Inventor: Karen Bouchard, Ayer, MA (US)

(73) Assignee: KIDDE-FENWAL, LLC, Ashland, MA (US)

( * ) Notice: Subject to any disclaimer, the term of this patent is extended or adjusted under 35 U.S.C. 154(b) by 0 days.

(21) Appl. No.: 17/961,730

(22) Filed: Oct. 7, 2022

(65) Prior Publication Data

US 2023/0126593 A1 Apr. 27, 2023

Related U.S. Application Data

(60) Provisional application No. 63/271,383, filed on Oct. 25, 2021.

(51) Int. Cl.

| | |
|---|---|
| ***G05G 7/00*** | (2006.01) |
| *A62C 3/00* | (2006.01) |
| *A62C 37/46* | (2006.01) |

(52) U.S. Cl.

CPC ................ *G05G 7/00* (2013.01); *A62C 3/006* (2013.01); *A62C 37/46* (2013.01)

(58) Field of Classification Search

CPC .......... F41B 7/046; F16H 55/36; F16H 55/52; H02K 5/26; F16D 2127/04; F16D 2121/14; F16D 9/00; A62C 3/006

USPC ............... 169/19, 51, 54, 56, 57, 58, 61, 65; 74/469, 491

See application file for complete search history.

(56) References Cited

U.S. PATENT DOCUMENTS

| | | | | |
|---|---|---|---|---|
| 712,525 | A | 11/1902 | Hamer | |
| 2,031,964 | A | 2/1936 | Mapes | |
| 2,316,789 | A | 4/1943 | Heigis et al. | |
| 2,486,447 | A | 11/1949 | Towart, Jr. | |
| 3,183,501 | A | 5/1965 | Seaton | |
| 3,356,801 | A | 12/1967 | Caretto | |
| 3,515,218 | A | 6/1970 | Gardner et al. | |
| 4,238,971 | A | 12/1980 | Amelio | |
| 4,280,120 | A | 7/1981 | Trafford et al. | |
| 4,728,928 | A | 3/1988 | Shipley | |
| 5,127,479 | A | 7/1992 | Stehling | |
| 5,297,636 | A | 3/1994 | North | |
| 5,871,056 | A | 2/1999 | Renna | |
| 6,286,604 | B1 | 9/2001 | Ou | |
| 8,763,993 | B2 | 7/2014 | Bohler | |
| 9,352,176 | B2 | 5/2016 | Erva et al. | |
| 2015/0231432 | A1 * | 8/2015 | Zlatintsis | A62C 37/46 169/61 |
| 2020/0161847 | A1 | 5/2020 | Hermey et al. | |

OTHER PUBLICATIONS

Extended European Search Report for European Application No. 22201391.4; Report Mail Date Mar. 3, 2023 (pp. 1-6).

* cited by examiner

*Primary Examiner* — T. Scott Fix
(74) *Attorney, Agent, or Firm* — Honigman LLP

(57) ABSTRACT

A manual activation system includes a housing and a pulley arranged within the housing. The pulley is movable between an inactive position and an active position. A tension member is wrapped about the pulley and has a tensile force acting on the pulley. At least one link arm is rotatably mounted within the housing. The at least one link arm is operably coupled to the pulley to selectively oppose the tensile force acting on the pulley.

3 Claims, 6 Drawing Sheets

CABLE INLINE PULL STATION RELEASE MECHANISM

CROSS-REFERENCE TO RELATED APPLICATIONS

This application claims the benefit of U.S. Provisional Application No. 63/271,383 filed Oct. 25, 2021, the disclosure of which is incorporated herein by reference in its entirety.

BACKGROUND

Embodiments of the present disclosure relate to a system and method for delivering a fire suppression agent to a cooking appliance in the event of a fire, and more particularly to a manually operated pull station for delivering a fire suppression agent through a delivery path.

Manual activation systems used in fire suppression systems, such as cable pull stations, are typically simple mechanical mechanisms. Commonly, a pulley is mounted within a housing by a pin. To activate the fire suppression system, the pin is removed from the housing to release the tension in the cable wrapped about the pulley. However, because all of the tension from the cable is acting on the pulley, and therefore on the pin supporting the pulley, a large amount of force is required to remove the pin, making the system difficult for a user to operate.

BRIEF DESCRIPTION

According to an embodiment, a manual activation system includes a housing and a pulley arranged within the housing. The pulley is movable between an inactive position and an active position. A tension member is wrapped about the pulley and has a tensile force acting on the pulley. At least one link arm is rotatably mounted within the housing. The at least one link arm is operably coupled to the pulley to selectively oppose the tensile force acting on the pulley.

In addition to one or more of the features described herein, or as an alternative, in further embodiments the pulley is mounted within a bracket, and when in the inactive position, the at least one link arm is engaged with a portion of the bracket.

In addition to one or more of the features described herein, or as an alternative, in further embodiments the bracket further comprises a contoured surface and the at least one link arm further comprises an engagement surface, the engagement surface being engaged with the contoured surface when the pulley is in the inactive position.

In addition to one or more of the features described herein, or as an alternative, in further embodiments a contour of the engagement surface is complementary to a contour of the contoured surface.

In addition to one or more of the features described herein, or as an alternative, in further embodiments the engagement surface and the contoured surface are sloped surfaces having identical angles.

In addition to one or more of the features described herein, or as an alternative, in further embodiments comprising an activation member selectively coupled to the at least one link arm when the pulley is in the inactive position.

In addition to one or more of the features described herein, or as an alternative, in further embodiments comprising at least one biasing mechanism operably coupled to the at least one link arm, the at least one biasing mechanism being configured to apply a biasing force on the at least one link arm in a direction away from the pulley.

In addition to one or more of the features described herein, or as an alternative, in further embodiments the activation member opposes the biasing force of the at least one biasing mechanism.

In addition to one or more of the features described herein, or as an alternative, in further embodiments the tension member is operably coupled to an actuator or a control box of a fire suppression system.

According to an embodiment, a manual activation system includes a pulley mounted within a bracket. The pulley and the bracket are movable between an inactive position and an active position. A tension member is wrapped about the pulley and has a tensile force acting on the pulley. A mechanical assembly is selectively coupled to the bracket to oppose the tensile force acting on the pulley.

In addition to one or more of the features described herein, or as an alternative, in further embodiments the bracket further comprises a feature having a contoured surface and a portion of the mechanical assembly is engaged with the contoured surface when the pulley and the bracket are in the inactive position.

In addition to one or more of the features described herein, or as an alternative, in further embodiments the mechanical assembly further comprises at least one link arm rotatable to selectively engage the contoured surface.

In addition to one or more of the features described herein, or as an alternative, in further embodiments the mechanical assembly further comprises an activation member positioned adjacent to the at least one link arm, wherein the activation member restricts movement of the at least one link arm out of engagement with the contoured surface.

In addition to one or more of the features described herein, or as an alternative, in further embodiments the mechanical assembly further comprises a biasing mechanism operably coupled to the at least one link arm, the biasing mechanism being configured to apply a biasing force on the at least one link arm in a direction away from the bracket.

In addition to one or more of the features described herein, or as an alternative, in further embodiments the activation member opposes the biasing force of the biasing mechanism.

According to an embodiment, a method of operating a manual activation system includes moving an activation member out of engagement with at least one link arm. The movement of the activation member out of engagement with the at least one link arm enabling the at least one link arm to rotate out of engagement with a bracket and the bracket and a pulley coupled to the bracket to move to an active position in response to a tensile force acting on the pulley by a tension member.

In addition to one or more of the features described herein, or as an alternative, in further embodiments the at least one link arm rotating out of engagement with the bracket further enables the at least one link arm to be biased in a direction away from the bracket via a biasing mechanism.

In addition to one or more of the features described herein, or as an alternative, in further embodiments the at least one link arm out rotating of engagement with the bracket occurs at least partially in response to the tensile force acting on the pulley.

In addition to one or more of the features described herein, or as an alternative, in further embodiments moving the activation member further comprises moving the activation member laterally out of a plane of rotation of the at least one link arm.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
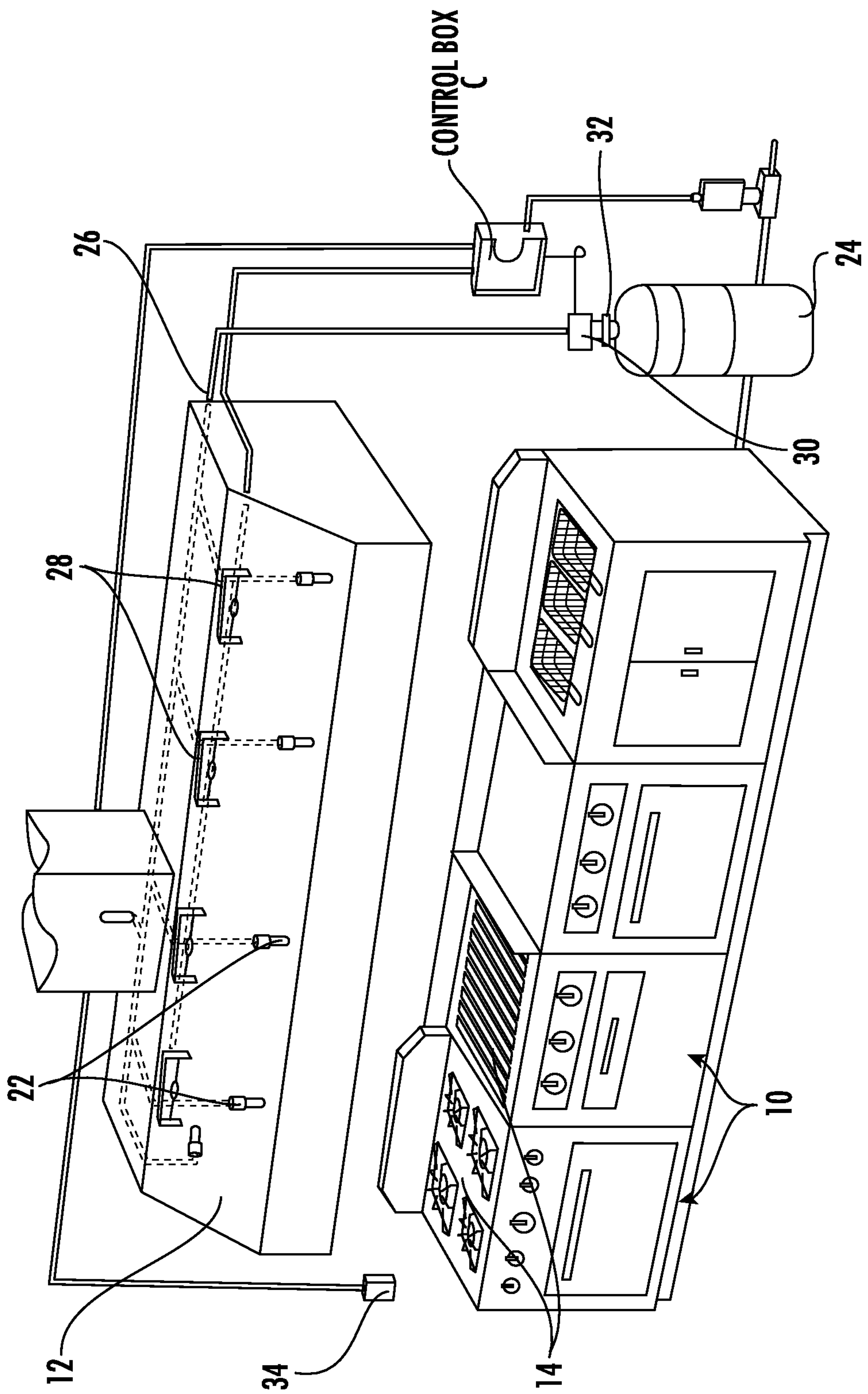
FIG. 1 is a schematic diagram of an exemplary system for delivering a fire suppression agent to at least one cooking appliance according to an embodiment.
Figure 2:
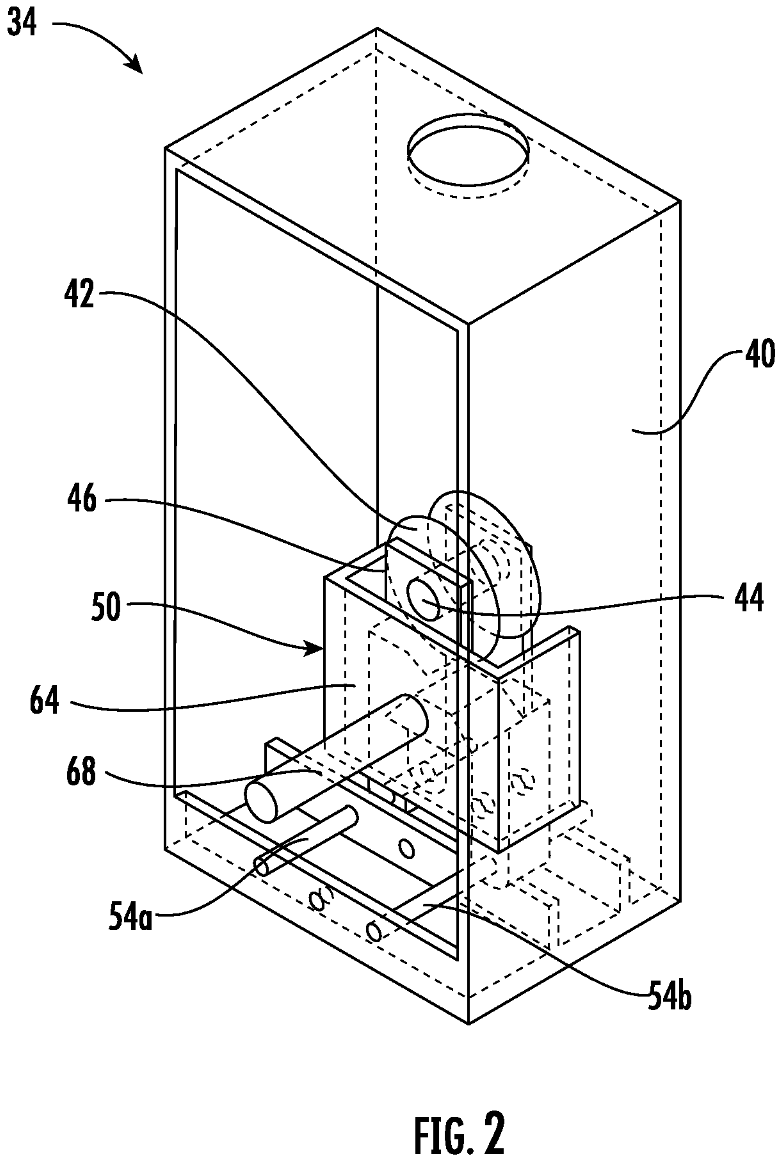
FIG. 2 is a perspective view of an exemplary manual activation system for use in a system for delivering fire suppression agent according to an embodiment.
Figure 3:
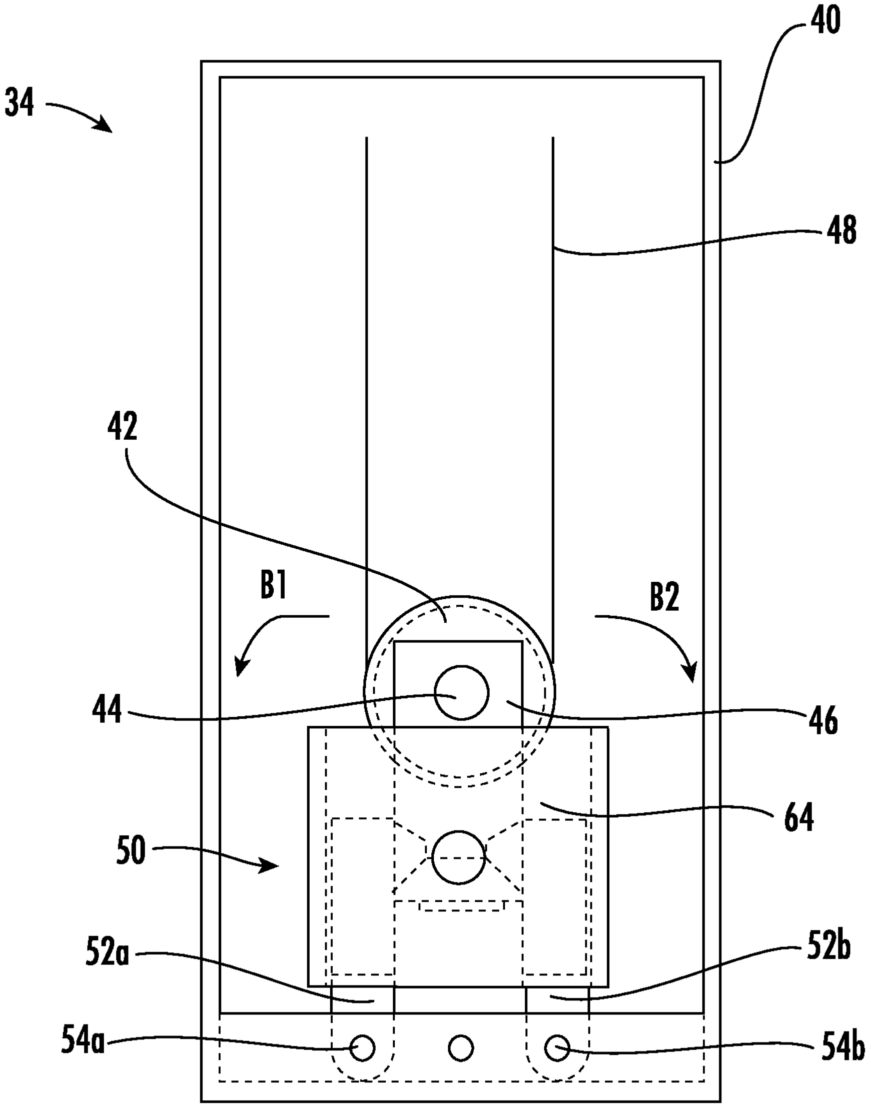
FIG. 3 is a front view of the manual activation system of FIG. 2 according to an embodiment.
Figure 4:
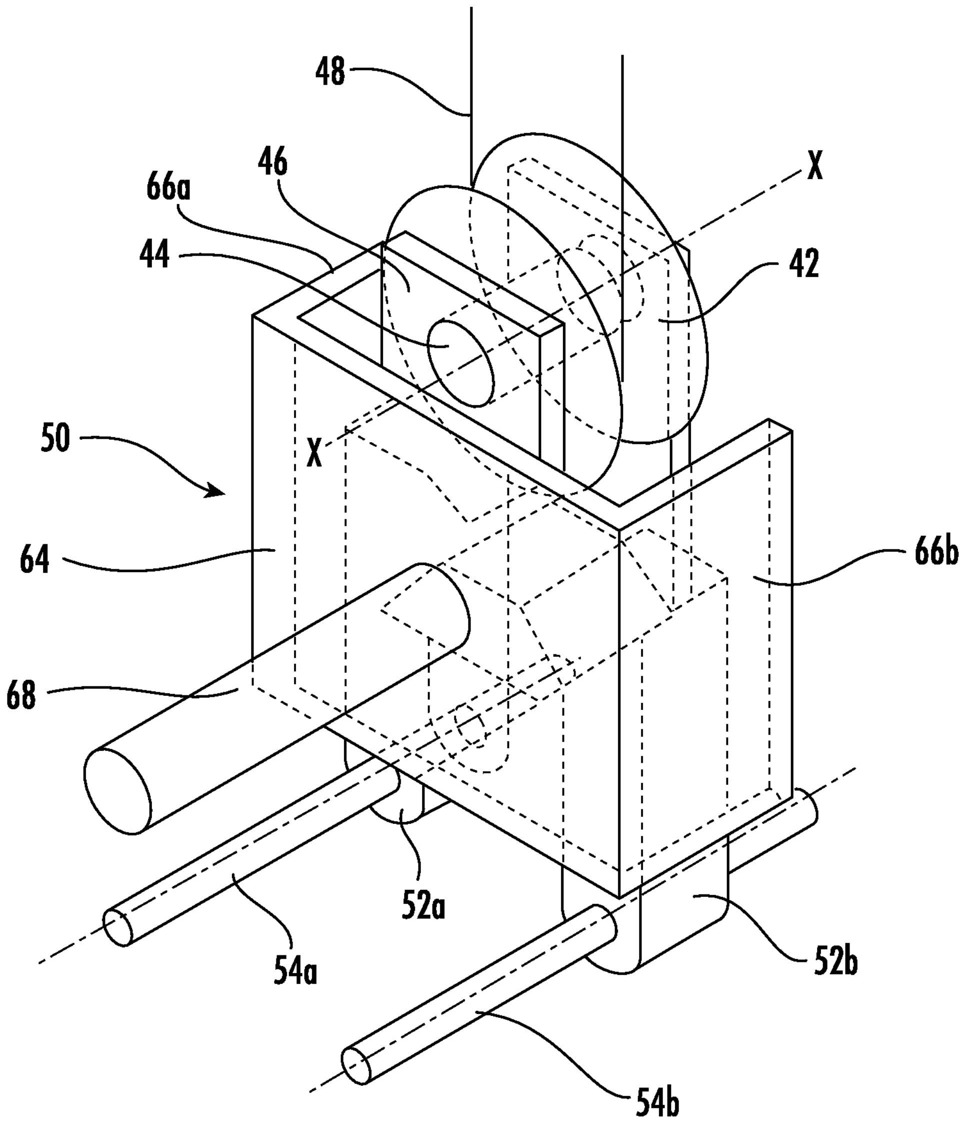
FIG. 4 is a perspective view of a portion of the manual activation system of FIG. 2 according to an embodiment.

With reference now to FIG. 1, an example of a system 20 for delivering a fire suppression agent to one or more cooking appliances 10 is illustrated. The fire suppression system 20 may be located separate or remotely from the cooking appliance 10, such as within a vent hood 12, or alternatively, may be integrated or housed at least partially within a portion of the cooking appliance 10. It should be understood that the configuration of the delivery system 20 will vary based on the overall structural design of the cooking appliance 10. The fire suppression system 20 includes one or more spray nozzles 22 associated with the cooking appliance 10 and a source of fire suppression agent 24 in the form of a self-contained pressure vessel. In embodiments including a plurality of cooking appliances 10, one or more spray nozzles 22 may be dedicated to each cooking appliance 10, or alternatively, one or more evenly spaced spray nozzles 22 may be used for all of the cooking appliances 10. The source of fire suppression agent 24 is arranged in fluid communication with the nozzles 22 via an agent delivery path defined by a delivery piping system 26. In the event of a fire, the fire suppression agent is allowed to flow through the delivery piping system 26 to the one or more spray nozzles 22 for release directly onto an adjacent cooking hazard area 14 of the one or more cooking appliances 10.

Those skilled in the art will readily appreciate that the fire suppression agent can be selected from materials such as water, dry chemical agent, wet chemical agent, or the like. Further, the source of fire suppression agent 24 may additionally contain a gas propellant for facilitating the movement of the fire suppression agent through the delivery piping system 26. However, embodiments where the propellant is stored separately from the fire suppression agent are also contemplated herein.

In an embodiment, the fire suppression system 20 is actuated in response to a fire sensing device (illustrated schematically at 28), such as a smoke detector or a heat sensor for example. In response to detecting heat or smoke exceeding an allowable limit, a control box C will direct a signal to an actuator 30 to open a valve 32 to allow the fire suppression agent to flow from the source 24 to the nozzles 22. Alternatively, or in addition, the fire suppression system 20 includes a manual activation system 34, also referred to herein as a pull station, configured to actuate the control box C to activate the valve 32 to initiate operation of the fire suppression system 20.

With reference now to FIGS. 2-6, an example of a manual activation system 34 is illustrated in more detail. The manual activation system 34 includes a housing 40 having a pulley 42 rotatably mounted to pin. 44. The pin 44 is supported by a bracket 46. Although the bracket 46 is illustrated as being generally U shaped or C-shaped and connected to the pin 44 at opposite sides of the pulley 42 along the axis X of rotation of the pin 44, it should be understood that any suitable bracket is within the scope of the disclosure. A tension member 48, such as a rope or cable for example, is wrapped about a portion of the pulley 42 and is operably coupled to the control box C of the delivery system 20. However, it should be understood that embodiments where the tension member 48 is operably coupled directly to the actuator 30 are also within the scope of the disclosure.

The pulley 42 is movable within the housing 40 between an inactive position and an active position. In the inactive position, as shown in FIGS. 2-5, the tension member 48 applies a force (e.g., tension) on the control box C for the delivery system 20 to be in an inactive state. When the pulley 42 transforms to an active position, such as by moving vertically within the housing 40, this tension within the cable 48, and therefore the force applied in the control box C is reduced. In response, the control box C will transmit an electrical or pneumatic signal to the actuator 30 to activate the delivery system 20.

The manual activation system 34 additionally includes a mechanical assembly 50 configured to maintain the pulley 42 in an inactive position. The mechanical assembly 50 includes at least one link arm pivotally or rotatably mounted to the housing 40 via a shaft. The at least one link arm is operably coupled to the pulley 42 to selectively oppose the tensile force acting on the pulley 42. The at least one link arm may be configured to rotate relative to the shaft, or alternatively, the at least one link arm may be fixedly mounted to the shaft and the shaft may be rotatably mounted to the housing 40. In the illustrated, non-limiting embodiment, the mechanical assembly 50 includes a two link arms 52*a*, 52*b* mounted to the housing 40 via two respective shafts 54*a*, 54*b*. Although two link arms are shown, it should be understood that an embodiment including only a single link arm and embodiments including more than two link arms are also contemplated herein. Although the first link arm 52*a* and the second link arm are 52*b* illustrated as being substantially identical but mounted as mirror images of one another, embodiments where the first link arm 52*a* and the second link arm 52*h* have different configurations are also within the scope of the disclosure.

The first shaft 54*a* and the second shaft 54*b* may, but need not be arranged parallel to one another. Further, the first link arm 52*a* and the second link arm 52*b* may be arranged adjacent opposing sides of the bracket 46. In the illustrated, non-limiting embodiment, the first and second link arms 52*a*, 52*b* are arranged within a plane oriented perpendicular to the plane containing the arms of the bracket 46.

Figure 5:
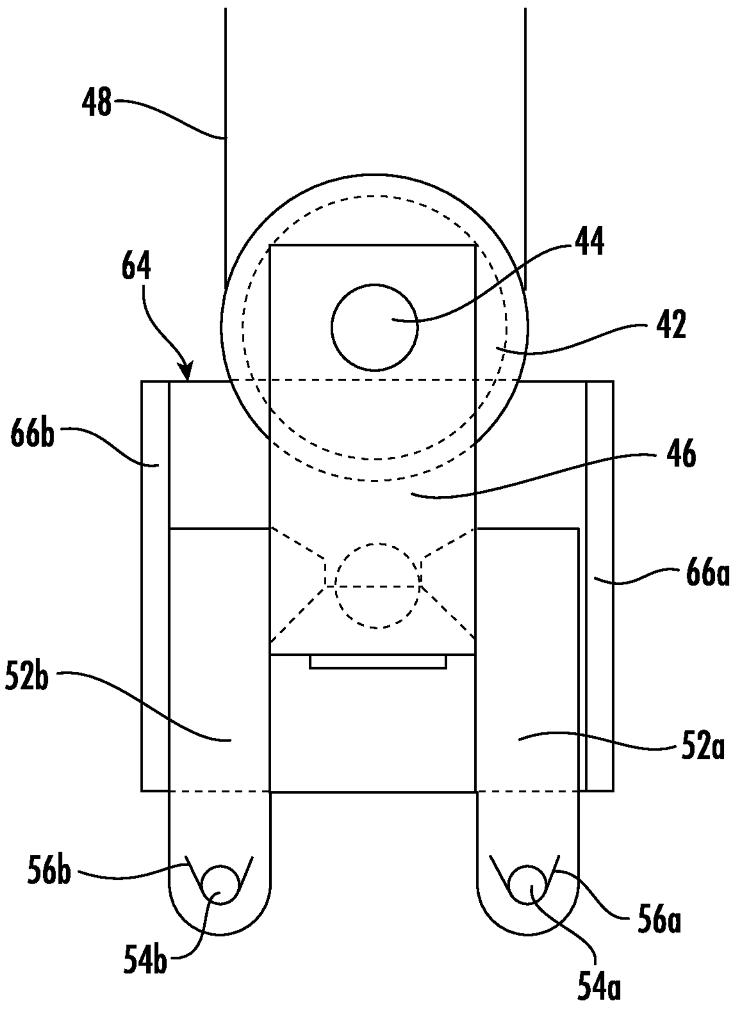
FIG. 5 is a rear view of the portion of the manual activation system of FIG. 4 according to an embodiment.

In an embodiment, at least one biasing mechanism, such as a torsion spring for example, is operably coupled to the at least one link arm. In embodiments where the link arm 52*a*, 52*b* is configured to rotate with the shaft 54*a*, 54*b*, the biasing mechanisms 56*a*, 56*b*, as shown in FIG. 5, may be mounted to the shafts 54*a*, 54*b*, respectively. However, in embodiments where the link arm 52*a*, 52*b* is configured to rotate relative to the shaft 54*a*, 54*b*, the biasing mechanism 56*a*, 56*b* may be mounted to the link arm 52*a*, 52*b*. In an embodiment, the biasing force of the biasing mechanism 56*a*, 56*b* is configured to rotate the at least one link arm 52*a*, 52*b* in a direction away from the bracket 46. In embodiments where the mechanical assembly 50 has a first and second link arm 52*a*, 52*b* mounted on opposite sides of the bracket 46, the first and second link arm 52*a*, 52*b* are biased in opposite directions, represented by arrows B1, and B2 respectively.

When the pulley 42 and therefore the manual activation system 34 is in an inactive position, the at least one link arm 52*a*, 52*b* is configured to oppose the tensile force acting on the pulley 42 by the tension member 48. In the inactive position, the at least one link arm 52*a*, 52*b* is operably coupled to the bracket 46. In an embodiment, the bracket 46 includes a feature 58 having at least one contoured surface 60 and the at least one link arm 52, 52*b* includes an engagement surface 62*a*, 62*b* configured to cooperate with or engage a corresponding surface of the bracket 46, such as the contoured surface 60 of the feature 58. In embodiments where the mechanical assembly 50 includes a first link arm 52*a* and a second link arm 52*b*, the feature may similarly include a first and second contoured surface 60, respectively. This engagement between the link arms 52*a*, 52*b* and the contoured surfaces opposes movement of the bracket 46, and therefore the pulley 42, in response to the tensile force acting on the tension member 48.

A contour of the engagement surface and the contoured surface may be generally complementary to one another. In the illustrated, non-limiting embodiment, the contoured surfaces 60 and the engagement surfaces 62*a*, 62*b* are sloped surfaces having substantially identical angles such that contact between the link arm 52*a*, 52*b* and the feature 58 is made over the substantially entire engagement surface 62*a*, 62*b* and contoured surface 60*a*, 60*b*; however, embodiments where the angles of the two surfaces 60*a*, 60*b*, 62*a*, 62*b* are different, or where the surfaces have different configurations and are configured to contact one another over only a portion thereof are also contemplated herein.

An activation member 64 is configured to cooperate with the one or more link arms 52*a*, 52*b* to maintain the tension acting on the pulley 42. In the illustrated, non-limiting embodiment, the activation member 64 may be a U-shaped or C-shaped channel having two arms 66*a*, 66*b* extending parallel to one another. When installed within the housing 40, the two arms 66*a*, 66*b* of the activation member 64 are positioned directly adjacent and in contact with the first and second link arm 52*a*, 52*b* respectively. The arms 66*a*, 66*b* of the activation member 64 oppose the biasing force of the biasing mechanisms 56*a*, 56*b* to restrict movement of the link arms 52*a*, 52*b* out of engagement with a portion of the bracket 46, such as the contoured surface 60. The arms 66*a*, 66*b* of the activation member 64 may therefore have any configuration such that the arms 66*a*, 66*b* are arranged at least partially within the path of rotation of each respective link arm 52*a*, 52*b*.

Figure 6:
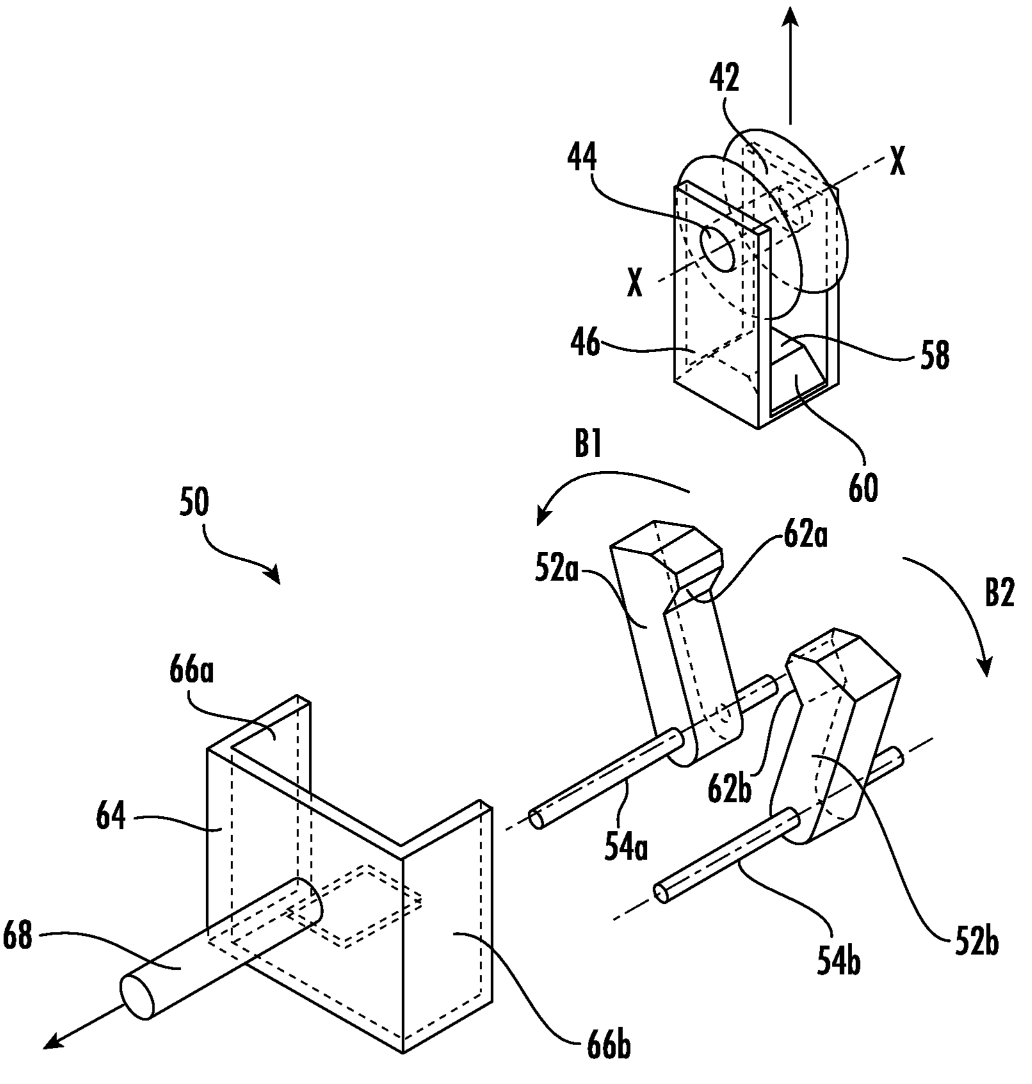
FIG. 6 is a perspective view of the portion of the manual activation system of FIG. 4 when the activation member is removed according to an embodiment.

With reference now to FIG. 6, to operate the manual activation system 34, a user moves the activation member 64 away from the remainder of the mechanical assembly 50 and the housing 40. In an embodiment, the activation member 64 is moved laterally, out of the plane of rotation of the link arms 52*a*, 52*b*. The activation member 64 may have a handle or other feature 68 to facilitate a user's manipulation of the activation member 64. Upon removing the activation member 64, the biasing force of the biasing mechanisms 56*a*, 56*b*, will bias the link arms 52*a*, 52*b* about their respective axes. This biasing force in combination with the tension acting on the pulley 42 will cause the link arms 52*a*, 52*b* to rotate out of engagement with the bracket 46. Without the link arms 52*a*, 52*b* opposing the tensile force of the tension member 48, the pulley is free to move within the housing 40 from the inactive position to the active position, thereby sending a signal to the control box C via a lack of cable tension.

By retaining the pulley 42 and bracket 46 in the inactive position via the mechanical assembly 50, the manual activation system 34 as illustrated and described herein does not require a user to move a component to which the tensile force of the tension member is applied. Accordingly, the force required to activate the activation system 34 by a user is limited.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A manual activation system comprising:

a pulley mounted within a bracket, the pulley and the bracket being movable between an inactive position and an active position, the bracket including a contoured surface;

a tension member wrapped about the pulley, the tension member having a tensile force acting on the pulley and the bracket;

a mechanical assembly selectively coupled to the bracket to oppose the tensile force acting on the pulley, the mechanical assembly including at least one link arm rotatable into engagement with the bracket, wherein engagement between the at least one link arm and the bracket opposes the tensile force, wherein the at least one link arm of the mechanical assembly is engaged with the contoured surface when the pulley and the bracket are in the inactive position;

an activation member positioned adjacent to the at least one link arm, wherein the activation member restricts movement of the at least one link arm out of engagement with the contoured surface; and a biasing mechanism operably coupled to the at least one link arm, the biasing mechanism being configured to apply a biasing force on the at least one link arm in a direction away from the bracket.

2. The manual activation system of claim 1, wherein the activation member opposes the biasing force of the biasing mechanism.

3. The manual activation system of claim 1, wherein the tension member is operably coupled to an actuator of a fire suppression system.

* * * * *